United States Patent
Hintze-Bruning et al.

(10) Patent No.: US 7,682,666 B2
(45) Date of Patent: Mar. 23, 2010

(54) METHOD OF PRODUCING A COLOR AND/OR EFFECT FILM EXHIBITING AN ISOTROPIC FLOP BEHAVIOR AND AN ISOTROPIC COLOR LOCUS

(75) Inventors: Horst Hintze-Bruning, Munster (DE); Frank Strickmann, Steinfurt (DE); Walter Lassmann, Munster (DE)

(73) Assignee: BASF Coatings AG, Muenster (DE)

(*) Notice: Subject to any disclaimer, the term of this patent is extended or adjusted under 35 U.S.C. 154(b) by 222 days.

(21) Appl. No.: 11/644,025

(22) Filed: Dec. 21, 2006

(65) Prior Publication Data
US 2007/0104898 A1 May 10, 2007

Related U.S. Application Data

(63) Continuation of application No. 10/483,503, filed on Jan. 8, 2004, now abandoned.

(30) Foreign Application Priority Data
Aug. 16, 2001 (DE) ................................. 101 40 205

(51) Int. Cl.
B05D 5/06 (2006.01)
B05D 7/04 (2006.01)
B05D 1/02 (2006.01)
B05D 1/26 (2006.01)
B05D 1/28 (2006.01)
B05D 1/34 (2006.01)
B05D 1/36 (2006.01)
B05D 1/38 (2006.01)

(52) U.S. Cl. .................... 427/407.1; 427/177; 427/356; 427/372.2; 427/412.1; 427/427.4; 427/427.7; 427/428.01

(58) Field of Classification Search ................. 427/177, 427/356, 358, 372.2, 407.1, 412.1–412.5, 427/420, 421.1, 427.4, 427.7, 428.01
See application file for complete search history.

(56) References Cited

U.S. PATENT DOCUMENTS

| 4,451,522 A | | 5/1984 | De Vroom |
| 4,593,360 A | * | 6/1986 | Cocks ........................ 700/123 |
| 4,769,100 A | | 9/1988 | Short et al. |
| 4,810,540 A | * | 3/1989 | Ellison et al. .................. 428/31 |
| 4,931,324 A | | 6/1990 | Eleison et al. |
| 5,026,448 A | | 6/1991 | Reafler et al. |
| 5,028,639 A | | 7/1991 | Treutlein et al. |
| 5,114,789 A | | 5/1992 | Reafler |
| 5,215,811 A | * | 6/1993 | Reafler et al. ................ 428/212 |
| 5,516,559 A | | 5/1996 | Rockrath et al. |
| 5,597,411 A | | 1/1997 | Fritzsche et al. |
| 5,601,878 A | | 2/1997 | Kranig et al. |
| 5,653,927 A | | 8/1997 | Flynn et al. |
| 5,707,697 A | | 1/1998 | Spain et al. |
| 5,744,240 A | * | 4/1998 | Lane et al. ................ 428/411.1 |
| 5,827,577 A | * | 10/1998 | Spencer ....................... 427/475 |
| 5,916,643 A | | 6/1999 | Spain et al. |
| 5,985,079 A | | 11/1999 | Eleison |
| 6,177,487 B1 | | 1/2001 | Sapper et al. |
| 6,254,712 B1 | | 7/2001 | Enlow et al. |
| 6,319,438 B1 | | 11/2001 | Smith et al. |
| 6,332,291 B1 | | 12/2001 | Flosbach et al. |
| 6,485,793 B1 | | 11/2002 | Ott et al. |

FOREIGN PATENT DOCUMENTS

| DE | 195 38 340 A1 | 4/1997 |
| EP | 0 352 298 B1 | 1/1990 |
| EP | 0 949 120 A1 | 10/1999 |
| WO | WO 00/51799 | 9/2000 |
| WO | WO 01/26879 A1 | 4/2001 |

OTHER PUBLICATIONS

English-language translation of the International Search Report for PCT/EP2002/008982, Oct. 1, 2003, 8 pages.*

* cited by examiner

*Primary Examiner*—William Phillip Fletcher, III
(74) *Attorney, Agent, or Firm*—Harness, Dickey & Pierce, P.L.C.

(57) ABSTRACT

Method of preparing single-layer or multilayer color and/or effect films comprising a color and/or effect layer, by (1) continuously applying a component amount of a basecoat material (A) by means of a directed application technique to a carrier, the applicator (1) and the carrier being in relative motion with respect to one another, to construct a portion of the color and/or effect layer, (2) at least once, continuously applying the remainder of the basecoat material (A) and/or a basecoat material (B), which is different than the basecoat (A), to the component layer (1) formed by an application technique (2) which in the resulting component layer (2) induces no arrangement of the pigments in a preferential direction, the applicator (2) and the carrier being in relative motion with respect to one another, to further or fully construct the color and/or effect layer, and (3) drying or partly or fully curing the color and/or effect layer.

26 Claims, No Drawings

METHOD OF PRODUCING A COLOR AND/OR EFFECT FILM EXHIBITING AN ISOTROPIC FLOP BEHAVIOR AND AN ISOTROPIC COLOR LOCUS

This application is a continuation of U.S. application Ser. No. 10/483,503, filed Jan. 8, 2004, now abandoned.

The present invention relates to novel color and/or effect films. The present invention also relates to a novel process for preparing color and/or effect films. The present invention additionally relates to the use of the novel color and/or effect films for coating three-dimensional shaped parts, especially motor vehicle bodies.

Color and/or effect paint systems on motor vehicle bodies, especially automobile bodies, are nowadays preferably composed of a plurality of coating layers which are applied atop one another and have different properties.

By way of example, a substrate will have applied to it successively an electrodeposited electrocoat as primer, a primer-surfacer or antistonechip primer coat, a basecoat, and a clearcoat.

Within this system, the electrocoat serves in particular to protect the sheet metal against corrosion. By those in the art it is often also referred to as the primer.

The primer-surfacer coat serves to mask unevennesses in the substrate and, by virtue of its elasticity, ensures stonechip resistance. Where appropriate, the primer-surfacer coat may also serve to strengthen the hiding power and to deepen the shade of the paint system.

The basecoat contributes the colors and/or the angle-dependent optical effects. Both the brightness (amount) and the color (through wavelength-specific absorption or through interference) of the reflected light may vary depending on the viewing angle, a phenomenon which is also referred to as brightness and/or color flop.

The clearcoat serves to intensify the optical effects and to protect the paint system against mechanical and chemical damage.

Basecoat and clearcoat are often also referred to collectively as the topcoat. For further details, refer to Römpp Lexikon Lacke und Druckfarben, Georg Thieme Verlag, Stuttgart, N.Y., 1998, pages 49 and 51, "automotive finishes".

A disadvantage is that these color and/or effect paint systems must often be applied in four separate steps, between each of which the applied films must be flashed off and also, where appropriate, baked, which is very time-consuming and labor-intensive and also leads to increased energy and plant costs. A further disadvantage is the environmental burden associated with the use of paints containing solvent.

Moreover, it has come to be recognized in the art that the application conditions for the basecoat materials in particular may greatly influence the color and flop characteristics of the basecoats. In respect of the applied basecoat films, similar comments are true for different drying conditions which have to be set owing to the use of different substrates, such as plastics and metals. In practice, these factors necessitate elaborate measures for color matching between components which abut one another directly on a vehicle body.

More recently, in order to avoid these problems from the outset, multilayer color and/or effect films have been proposed for the coating of motor vehicle bodies, especially exterior parts of motor vehicle bodies. These known multilayer color and/or effect films can be prepared under constant conditions and applied to any desired substrates to give, as a result, a substrate- and process-independent color and/or optical effect. Application may be carried out by laminating onto metals, injection backmolding with thermoplastics, foam backing, or compression backmolding. The corresponding processes and films are known, for example, from the American U.S. Pat. No. 4,810,540 A, U.S. Pat. No. 4,931,324 A or U.S. Pat. No. 5,114,789 A, the European patents EP 0 266 109 B1, EP 0 285 071 B1, EP 0 352 298 B1 or EP 0 449 982 B1, the European patent applications EP 0 949 120 A1, EP 0 261 815 A1 or EP 0 050 794 A1 or the international patent application WO 96/40449.

From the European patent application EP 0 949 120 A1 in particular a multilayer color and/or effect film is known in which located between the basecoat and the clearcoat there is a so-called adjustment layer with a thickness of from 2.5 to 25 µm in order to adjust the color of the basecoat toward a specified standard. The basecoat, which is approximately 25 µm thick, is produced by extrusion, and the adjustment layer is applied by means of printing techniques. A solution to the problems bound up with a directed application process in which the pigments are aligned in a preferential direction is not offered in the patent application.

Whereas the advantages described may be realized with simple colors, such as solid colors, this is not the case with demanding effect paints, such as metallic effects. Because the known films are generally produced by a directed process, such as extrusion to form flat films or the casting of liquid basecoat materials onto carrier films, the color locus and the flop characteristics of the color and/or effect layers are not isotropic; in other words, when the layers are viewed from different angles relative to the preferential direction of the production process, different colors and effects are perceived. The reason for this is the orientation of the platelet-shaped effect pigments, such as platelet-shaped aluminum pigments, which have an aspect ratio >1, in the direction determined by the production. A further inhomogeneity is generated by the statistically preferred orientation of the surface normals of the platelet-shaped effect pigments relative to the plane of the substrate in said preferential direction. When the known multilayer color and/or effect films are processed to homogeneously colored coatings for motor vehicle bodies, these disadvantageous effects result in an increased logistical effort and in large quantities of offcuts, which significantly curtails the economics of the coatings.

It is true that these disadvantages could be eliminated by preparing the color and/or effect layers by spray application of basecoat materials, which normally provides isotropic coatings. To do so, however, would introduce other disadvantages, for the reasons set out below.

Taken overall, the known multilayer color and/or effect films are considerably thicker than the conventional multicoat color and/or effect paint systems. In particular, the color and/or effect layers of the films are required to be from more than two up to four times thicker than the basecoats of conventional multicoat paint systems in order to retain a sufficiently high hiding power under the conditions of stretching which occur during the coating of three-dimensional articles, and which may amount to more than 200%, and to suffer as little change as possible in color and optical effect.

Economic preparation of thick, isotropic color and/or effect layers by spray application is, however, not possible owing to the comparatively low application rate and the normally low solids contents of color and/or effect basecoat materials.

The disadvantages set out above arise not only when using effect pigments which give rise to optical effects but also in the case of electrically conductive, magnetically shielding or fluorescent pigments.

It is an object of the present invention to provide novel color and/or effect, single-layer or multilayer films which can be prepared economically and which no longer have the disadvantages of the prior art. In particular, it is intended that the novel multilayer color and/or effect films should exhibit isotropic flop characteristics and an isotropic color locus, both independently of the viewing angle, so that their processing to coatings for three-dimensional articles, especially motor vehicle bodies, is no longer accompanied by any logistical problems or any large quantities of offcuts. Even in the stretched areas, the novel coatings produced from the novel single-layer or multilayer color and/or effect films should continue to have a sufficiently high hiding power and to suffer very little if any change in color and effect. Overall, in terms of gloss, distinctiveness of image, uniformity of hiding ability, uniformity of film thickness, resistance to motor fuel, solvents and acids, hardness, abrasion resistance, mar resistance, impact strength, adhesion, weathering stability, and resistance to water and humidity, the novel coatings should exhibit the so-called "automotive quality" (in this respect, cf. also the European patent EP 0 352 298 B1, page 15 line 42 to page 17 line 40).

The invention accordingly provides the novel single-layer or multilayer color and/or effect films which consist of or comprise at least one color and/or effect layer comprising (1) at least one component layer (1) comprising at least one color and/or effect pigment (1) in anisotropic distribution, and
(2) at least one component layer (2) comprising the pigment or pigments (1) and/or at least one different color and/or effect pigment (2) in isotropic distribution.

The invention also provides the novel single-layer or multilayer color and/or effect films which consist of or comprise at least one color and/or effect layer preparable by (1) continuously applying a component amount or the total amount of at least one basecoat material (A) by means of a directed application technique to a carrier, the applicator (1) and the carrier being in relative motion with respect to one another, to construct a portion of the color and/or effect layer,
(2) once, or at least twice, continuously applying the remainder of the basecoat material (A) and/or at least one basecoat material (B), which is different than the basecoat(s) (A), to the component layer (1), formed in step (1), by at least one application technique (2) which in the resulting component layer induces no arrangement of the pigments in a preferential direction, the applicator(s) (2) and the carrier being in relative motion with respect to one another, to further or fully construct the color and/or effect layer, and
(3) drying or partly or fully curing the resulting color and/or effect layer.

In the text below, the novel single-layer or multilayer color and/or effect films are referred to collectively as "films of the invention".

The invention further provides the novel process for preparing single-layer or multilayer color and/or effect films which comprises (1) continuously applying a component amount or the total amount of at least one basecoat material (A) by means of a directed application technique to a carrier, the applicator (1) and the carrier being in relative motion with respect to one another, to construct a portion of the color and/or effect layer,
(2) once, or at least twice, continuously applying the remainder of the basecoat material (A) and/or at least one basecoat material (B), which is different than the basecoat(s) (A), to the component layer (1), formed in step (1), by at least one application technique (2) which in the resulting component layer induces no arrangement of the pigments in a preferential direction, the applicator(s) (2) and the carrier being in relative motion with respect to one another, to further or fully construct the color and/or effect layer, and
(3) drying or partly or fully curing the resulting color and/or effect layer (2).

In the text below, the novel process for preparing single-layer or multilayer color and/or effect films is referred to as the "process of the invention".

In the light of the prior art it was surprising and unforeseeable for the skilled worker that the object on which the present invention was based could be achieved by means of the films of the invention and by means of the process of the invention.

In particular it was surprising that a comparatively thin, isotropic color and/or effect layer with isotropically arranged color and/or effect pigments atop a comparatively thick, anisotropic color and/or effect layer with anisotropically arranged—that is, aligned in a preferential direction—color and/or effect pigments gave rise to the same or virtually the same color and/or the same optical and/or other physical effect as a completely isotropic layer.

Even more surprising was that by means of the process of the invention it was possible in a simple way to prepare films of the invention comprising at least two color and/or effect layers of different color and/or effect one above the other, thereby making it possible to produce decorative and/or physical effects which were otherwise difficult to produce.

Above all, however, the films of the invention surprisingly exhibited an isotropic flop behavior and an isotropic color locus, both of which were independent of the viewing angle, so that their processing to coatings for three-dimensional articles, especially motor vehicle bodies, was no longer accompanied by any logistical problems or any large quantities of offcuts. The coatings of the invention produced from the films of the invention surprisingly continued to have a sufficiently high hiding power, even in the extended areas.

Overall, as regards gloss, distinctiveness of image, uniformity of hiding ability, uniformity of film thickness, resistance to motor fuel, solvents and acids, hardness, abrasion resistance, mar resistance, impact strength, adhesion, weathering stability, and resistance to water and humidity, the novel coatings were of "automotive quality".

The films of the invention comprise at least one, especially one, color and/or effect layer, or consist thereof.

In special cases, the films of the invention may comprise at least two, especially two, color and/or effect layers one above the other, the upper layer(s) fully or partly, especially partly, covering the underlying layer(s). Preferably, the partial coverage is of imagewise configuration. In this way it is possible to combine not only different colors but also different physical and optical effects with one another for the purpose, for example, of information or signaling.

The films of the invention may be prepared in any of a very wide variety of ways; preferably, they are produced by means of the process of the invention.

In the process of the invention, at least one, especially one, basecoat material (A) or at least one, especially one, basecoat material (A) and at least one, especially one, basecoat material (B) different than the basecoat material (A) is used.

The material composition of the basecoat materials (A) and (B) is not critical; rather, it is possible to use the customary and known, conventional or aqueous basecoat materials, such as are known, for example, from the American U.S. Pat. No. 5,114,789 A, column 7 line 41 to column 8 line 33, column 11 lines 24 to 50, and column 13 lines 30 to 40, the European patent EP 0 352 298 B1, page 9 line 19 to page 12 line 38, or the patent applications EP 0 089 497 A1, EP 0 256 540 A1, EP 0 260 447 A1, EP 0 297 576 A1, WO 96/12747, EP 0 523 610

A1, EP 0 228 003 A1, EP 0 397 806 A1, EP 0 574 417 A1, EP 0 531 510 A1, EP 0 581 211 A1, EP 0 708 788 A1, EP 0 593 454 A1, DE 43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1, EP 0 496 205 A1, EP 0 358 979 A1, EP 0 469 389 A1, DE 24 46 442 A1, DE 34 09 080 A1, DE 195 47 944 A1, DE 197 41 554 A1 or EP 0 817 684, column 5 lines 31 to 45.

It is essential that the basecoat materials (A) and/or (B) comprise color and/or effect pigments. The color and/or effect pigments are preferably selected from the group consisting of organic and inorganic, colored, optical effect-imparting, electrically conductive, magnetically shielding, and fluorescent pigments, metal powders, organic and inorganic, transparent and hiding fillers, and nanoparticles. The pigments preferably have an aspect ratio >1.

Examples of suitable effect pigments are metal flake pigments such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, platelet-shaped effect pigments based on iron oxide with a shade from pink to brownish red, or liquid-crystalline effect pigments. For further details, refer to Römpp Lexikon Lacke und Druckfarben, Georg Thieme Verlag, 1998, page 176, "effect pigments" and pages 380 and 381, "metal oxide-mica pigments" to "metal pigments" and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A or U.S. Pat. No. 5,244,649 A.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, refer to Römpp Lexikon Lacke und Druckfarben, Georg Thieme Verlag, 1998, pages 180 and 181, "Iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52, "azomethine pigments", "azo pigments", and page 379, "metal complex pigments".

Examples of fluorescent pigments (daylight-fluorescent pigments) are bis(azomethine) pigments.

Examples of suitable electrically conductive pigments are titanium dioxide/tin oxide pigments.

Examples of magnetically shielding pigments are pigments based on iron oxides or chromium dioxide.

Examples of suitable metal powders are powders of metals and metal alloys such as aluminum, zinc, copper, bronze or brass.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers, such as polymer powders, especially those of polyamide, polyvinylidene difluoride (PVDF) or polyacrylonitrile. For further details, refer to Römpp Lexikon Lacke und Druckfarben, Georg Thieme Verlag, 1998, pages 250 ff., "fillers".

It is preferred to employ mica and talc if the mar resistance of the color and/or effect layers produced from the basecoat materials is to be improved.

It is further of advantage to use mixtures of platelet-shaped inorganic fillers such as talc or mica and nonplatelet-shaped inorganic fillers such as chalk, dolomite, calcium sulfates or barium sulfate, since by this means the viscosity and rheology may be set very effectively.

Examples of suitable transparent fillers are those based on silica, alumina or zirconium oxide.

Suitable nanoparticles are selected from the group consisting of hydrophilic and hydrophobic, especially hydrophilic, nanoparticles based on silica, alumina, zinc oxide and zirconium oxide and the polyacids and heteropolyacids of transition metals, preferably of molybdenum and tungsten, having a primary particle size <50 nm, preferably from 5 to 50 nm, in particular from 10 to 30 nm. The hydrophilic nanoparticles preferably have no flatting effect. Particular preference is given to using nanoparticles based on silica.

Very particular preference is given to using hydrophilic pyrogenic silicas whose agglomerates and aggregates have a chainlike structure and which are preparable by the flame hydrolysis of silica tetrachloride in an oxyhydrogen flame. They are sold, for example, by Degussa under the brand name Aerosil®. Very particular preference is also given to using precipitated waterglasses, such as nanohectorites, which are sold, for example, by Südchemie under the brand name Optigel® or by Laporte under the brand name Laponite®.

The pigments (1) and (2) present in the component layers (1) and (2) may be materially identical with or different than one another.

According to the process of the invention, a portion or the total amount of at least one, especially one, basecoat material (A) is applied to a carrier by means of a directed application technique (1) in the first step (1).

The applicator (1) and the carrier are in relative motion with respect to one another. Preferably, the applicator (1) is stationary and the carrier is passed under or over, preferably under, the applicator (1) at a suitable uniform rate of advance, which depends on the requirements of the case in hand and may be set easily by the skilled worker.

In the context of the present invention, a directed application technique is a technique which gives rise to a certain orientation or preferential direction with the above-described pigments in the basecoat layers, which lead to inhomogeneities and anisotropies in the color and/or effect layers. Secondly, however, these directed application techniques have the substantial advantage that they can be used to prepare comparatively thick layers without problems.

Examples of suitable directed application techniques are casting, knife coating, roller coating or extrusion coating. These techniques may be carried out using customary and known devices, such as casting devices, knife coaters, rollers, especially contrarotating rollers, or extruders, especially film extruders.

In step (1), preferably the largest part (1) of the color and/or effect layer (2) is constructed. In other words, the component layer (1) formed has preferably more than 50%, more preferably more than 60%, with particular preference more than 65%, with very particular preference more than 70%, and in particular more than 75% of the dry film thickness of the color and/or effect layer.

In step (1), a portion of the basecoat material (A) is applied to a carrier. If in step (2) a basecoat material (B) is applied that is different than the basecoat material (A), the entirety of the basecoat material (A) may be applied in step (1).

The carrier may be permanent or temporary.

Where a temporary carrier is used, the films of the invention are peeled off from it following their preparation, after which they may be used as single-layer films of the invention or may be joined with other layers or films to form multilayer films of the invention.

The temporary carriers may comprise circulating metal belts or plastic belts or temporary carrier films, which may have been provided with a release layer. Examples of suitable temporary carrier films, particularly those based on polyester, are known from the European patent EP 0 352 298 B1, page 7 lines 31 to 49.

Where a permanent carrier is used, the films of the invention remain firmly joined to it following their preparation.

Preferably, the permanent carriers comprise polymer films which take on a technical function in the films of the invention. Preferably, the polymer films comprise clearcoat films, adhesion films or comparatively thick, thermoformable carrier films, such as are known, for example, from the European patent EP 0 352 298 B1, page 7 line 54 to page 10 line 51 and page 12 line 55 to page 13 line 53, or from the American U.S. Pat. No. 4,810,540 A, column 3 line 37 to column 5 line 15. Preferably, the polymer films used as permanent carriers are thermoplastic. They may be solid or they may be not yet fully solidified and may solidify only after the application of the component layer (1) or of the color and/or effect layer (2), thereby resulting in a particularly high level of interlayer adhesion in the assembly. The polymer films may also be pigmented, especially for adjustment toward the brightness of the color and/or effect layer (2).

After the end of step (1) in the process of the invention, in step (2) the remainder of the basecoat material (A) and/or the basecoat material (B), which is different than the basecoat material (A), is applied to the component layer (1). Preferably in step (2), the remainder of the basecoat material (A) is applied.

The basecoat material (A) and/or the basecoat material (B) is applied continuously once or at least twice.

Where continuous application once is employed, the color and/or effect layer is constructed completely in the first and only step (2).

Where continuous application at least twice is employed, the color and/or effect layer is built up further in the first step (2), to give an assembly comprising carrier, component layer (1) and first component layer (2). Complete construction then takes place in at least one further step (2).

In step (2), at least one application technique (2) is employed which gives rise in the resulting component layer (2) to no arrangement of the above-described pigments in a preferential direction, i.e., an anisotropy.

In accordance with a first preferred variant of the process of the invention, the step or steps (2) is or are carried out in time directly after the step (1), i.e., simultaneously with step (1).

In accordance with a second preferred variant of the process of the invention, the step or steps (2) are carried out in time later after the step (1) of the invention, i.e., sequentially. In this case, the component layer (1) may be dried or partly or fully cured. Preferably, the assembly composed of carrier and component layer (1) is wound up onto rolls and stored in this form until step (2) is implemented. In this case it is of advantage to apply a release layer, preferably a release film, to the component layer (1).

Between the two steps (1) and (2), the component layer (1) is preferably vented.

This is preferably brought about by providing, in the case of the simultaneous variant of the process of the invention, for a greater or lesser physical distance to prevail between the applicator (1) of step (1) and the applicator(s) (2) of the step or steps (2). The physical distance is guided by the evaporation characteristics of the component layer (1) and may therefore be set by the skilled worker on the basis of his or her general knowledge in the art, where appropriate with the assistance of simple rangefinding tests.

In the case of the sequential variant of the process of the invention, venting is preferably brought about by providing a greater or lesser temporal distance between step (1) and step (2) or the first step (2). The temporal distance is also guided by the evaporation characteristics of the component layer (1) and may therefore be set by the skilled worker on the basis of his or her general knowledge in the art, where appropriate with the assistance of simple rangefinding tests.

Overall it is advantageous if, after venting, the component layer (1) has still not fully dried but instead still has a certain residual moisture and/or organic solvent content.

In step (2), the basecoat materials (A) and/or (B) are applied continuously by at least one application technique (2) to the component layer (1) produced in step (1). The application technique (2) does not give rise to an arrangement of the above-described pigments in a preferential direction in the resulting component layer (2); in other words, the pigments are isotropically distributed. At the time of application, the applicator(s) (2) and the carrier with the component layer (1) and also, where appropriate, with the first component layer (2) are in relative motion with respect to one another. The assemblies comprising carrier and component layer (1) and also, where appropriate, first component layer (2) may be passed in relative motion under or over, preferably under, the applicator(s) (2).

The application of the basecoat materials (A) and/or (B) may take place once, to give the complete color and/or effect layer. Alternatively, the application may take place at least twice, i.e., in at least two component steps (2): in this case, the color and/or effect layer is built up further in the first component step (2) and its construction is concluded in at least one further component step (2).

The application of at least one further component layer (2) may be carried out simultaneously or sequentially. If it is carried out sequentially, the assembly comprising carrier, component layer (1) and first component layer (2) is preferably wound up onto rolls for storage until the second component step (2) is carried out.

Preferably, the application techniques (2) are spray application techniques and the applicators (2) are spray applicators. The applicators may be pneumatic sprayers (2) (cf. Römpp Lexikon Lacke und Druckfarben, Georg Thieme Verlag, Stuttgart, N.Y., 1998, page 165, "compressed air spraying") or electrostatic sprayers (2) (cf. Römpp Lexikon Lacke und Druckfarben, Georg Thieme Verlag, Stuttgart, N.Y., 1998, page 186: "electrostatic coating", page 187: "electrostatic spray guns", "electrostatic spraying")

With the simultaneous application of component layer (1) and component layer (2) or of the first component layer (2), the applicator(s) (2) is or are disposed directly downstream of the applicator(s) (1). In the case of sequential application, the applicator(s) (2) is or are preferably part(s) of a further unit to which the assemblies comprising carrier and component layer (1) and also, where appropriate, first component layer (2) are supplied, preferably in the form of wound-up rolls.

Irrespective of which variant of the process of the invention is carried out, the applicator(s) (2) may be stationary. Preferably, they span in their entire width the assemblies comprising carrier and component layer (1) and also, where appropriate, first component layer (2). They may be arranged transversely to the direction of motion or at an oblique angle to it. The angle between the edge of an assembly and the main axis of an applicator (2) may be obtuse to acute.

Where at least two applicators (2) are used, they may be arranged in series. In this case, they may stand parallel to or oblique to one another. Alternatively, the at least two applicators (2) may intersect at obtuse to acute angles.

Preferably, one stationary applicator (2) comprises at least two devices for applying the basecoat materials (A) or (B), in particular at least two pneumatically or electrostatically operated spraying heads each with at least one spray nozzle.

Alternatively, the applicator(s) (2) may be disposed in such a way as to be movable back and forward transversely and/or obliquely to the direction of motion of the assemblies comprising carrier and component layer (1) and also, where appropriate, first component layer (2). The movable applicators (2) preferably comprise at least one device for applying the basecoat materials (A) or (B), in particular at least one pneumatically or electrostatically operating spraying head each with at least one spray nozzle.

In the context of the process of the invention, the stationary and movable applicators (2) may be combined with one another. Furthermore, they may be movable in the vertical plane.

By means of the applicators (2), the basecoat materials (A) and/or (B) may be applied at right angles or obliquely, at an acute to obtuse angle, with respect to the plane of the assembly comprising carrier and component layer (1) and also, where appropriate, first component layer (2). They may be applied in or against the direction of motion of the assembly. In the context of the process of the invention, these measures may be combined with one another.

The basecoat spray jets produced by the spray applicators (2) used with preference may overlap. If so, their areas of impingement may partly or fully coincide. The overlap may be achieved, for example, by spraying at least two basecoat spray jets against one another under an acute to obtuse angle. Alternatively, overlapping basecoat spray jets may be produced with the aid of spraying heads which comprise at least two spray nozzles in concave or convex arrangement, such as are known, for example, from the patent applications and patents DE 195 38 340 A1, WO 97/14506, U.S. Pat. No. 4,378,386 A or U.S. Pat. No. 5,366,162 A.

In many cases, the isotropy of the component layers (2) may be improved further if the pneumatically generated spray jets—or, to be more precise, the spray jet clouds generated—are set in periodic—that is, regularly repeating—motion relative to the spraying direction and relative to the component layer (1).

In this context, any desired periodic motions of the spray jet cloud may be considered. Examples of highly suitable periodic motions are
 the circular or eccentric rotation of the spray jet cloud about its direction of propagation, resulting in a helical propagation of the coating material,
- the wave-form propagation of the coating material, in the form of a sinusoidal wave, for example, or
- the pulsating propagation of the coating material, where in the spray jet cloud, as viewed in the direction of spraying, areas rich in coating material alternate periodically with areas low in coating material.

These periodic motions may be combined with one another as desired in such a way that at least two of them are superposed.

In order to generate these periodic motions, the customary and known devices for compressed air spraying, particularly the spray guns, are modified appropriately by equipping them with movable spray nozzles. Accordingly, preference is given to using rotating spray nozzles, spray nozzles which move backward and forward periodically as viewed in the direction of spraying, or spray nozzles in eccentric disks. For purposes of the superposition of forms of motion, construction principles may be combined with one another appropriately. For example, rotating spray nozzles may be mounted in such a way that they may also be moved backward and forward periodically. The construction of these spray guns has no special features; instead, the construction principles, materials, and measurement and control techniques employed are those which are customary and known in the field of moving spray nozzles.

The frequency, the rate and/or the spatial extent or deflection of the periodic motion which is imposed in accordance with the invention on the propagating spray jet cloud may vary very widely and is guided by the requirements of the case in hand. The skilled worker is able to determine those conditions which are optimum in each case, where appropriate by means of simple preliminary tests.

By means of step or steps (2), the color and/or effect layer is fully constructed. Its wet layer thickness may vary widely and is guided in particular by the dry layer thickness which ensures sufficient hiding power of the color and/or effect layer in the coating of the invention. In the case in hand, therefore, the skilled worker is able to determine the appropriate wet layer thickness on the basis of his or her general knowledge of the art, where appropriate with the assistance of simple preliminary tests.

Subsequently, the color and/or effect layer is dried or partly or fully cured. Preferably, it is dried. Drying may be carried out using customary and known methods, such as irradiation with IR or microwave radiation or treatment with hot air in countercurrent.

After drying, the resulting films of the invention may be wound up onto rolls before being used further.

Where the films of the invention comprise the above-described clearcoat films as permanent carriers, their color and/or effect layers may be provided, on their side facing away from the clearcoat film, with one of the above-described, comparatively thick, thermoformable carrier films and/or an adhesion film before they are used to produce coatings.

Where the films of the invention already comprise the above-described, comparatively thick, thermoformable carrier films as permanent carriers, their color and/or effect layers may be provided, on their side facing away from the thermoformable carrier film, with one of the above-described clearcoat films or with a clearcoat, before they are used to produce coatings. Between the color and/or effect layer and the clearcoat there may also be an adjustment layer, as described, for example, in the European patent application EP 0 949 120 A1.

The film of the invention may also, however, have a structure which corresponds to that of the customary and known automotive finish, comprising electrocoat or anticorrosion layer, (where appropriate) primer-surfacer coat or antistonechip primer coat, basecoat, and clearcoat (automobile structure).

Suitable clearcoat materials for producing the clearcoats include all customary and known one-component (1K), two-component (2K) or multicomponent (3K, 4K) clearcoat materials, powder clearcoat materials, powder slurry clearcoat materials or UV-curable clearcoat materials.

Thermally curable one-component (1K), two-component (2K) or multicomponent (3K, 4K) clearcoat materials are known from the European patent applications DE 42 04 518 A1, 0 594 068 A1, 0 594 071 A1, 0 594 142 A1, 0 604 992 A1 or 0 596 460 A1, the international patent applications WO 94/10211, WO 94/10212, WO 94/10213, WO 94/22969 or WO 92/22615 or the American U.S. Pat. No. 5,474,811 A, 5,356,669 A or 5,605,965 A.

One-component (1K) clearcoat materials include, as is known, hydroxyl-containing binders and crosslinking agents such as blocked polyisocyanates, tris(alkoxy-carbonylamino)triazines and/or amino resins. In another variant, they comprise, as binders, polymers containing pendant carbamate and/or allophanate groups, and carbamate- and/or allophanate-modified amino resin crosslinking agents (cf. the American U.S. Pat. No. 5,474,811 A, 5,356,669 A or 5,605,965 A1, the international patent applications WO 94/10211, WO 94/10212 or WO 94/10213, or the European patent applications EP 0 594 068 A1, 0 594 071 A1 or 0 594 142 A1).

Two-component (2K) or multicomponent (3K, 4K) clearcoat materials comprise as essential constituents, as is known, hydroxyl-containing binders and polyisocyanate crosslinking agents, which are stored separately until they are used.

Thermally curable powder clearcoat materials are known, for example, from the German patent application DE 42 22 194 A1, the BASF Lacke+Farben AG product information literature "Pulverlacke" [powder coating materials], 1990, or the BASF Coatings AG brochure "Pulverlacke, Pulverlacke für industrielle Anwendungen" [powder coating materials, powder coatings for industrial applications], January 2000.

The familiar essential constituents of powder clearcoat materials include binders containing epoxide groups, and polycarboxylic acid crosslinking agents.

Examples of suitable powder slurry clearcoat materials are known from the U.S. Pat. No. 4,268,542 A1 and from the patent applications DE 195 40 977 A1, DE 195 18 392 A1, DE 196 17 086 A1, DE 196 13 547 A1, EP 0 652 264 A1, DE 196 18 657 A1, DE 196 52 813 A1, DE 196 17 086 A1 or DE 198 14 471 A1.

Powder slurry clearcoat materials contain, as is known, powder clearcoat materials in dispersion in an aqueous medium.

Clearcoat materials, powder clearcoat materials, and powder slurry clearcoat materials that are curable with actinic radiation are disclosed, for example, by the European patent applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 or EP 0 002 866 A1, the German patent applications DE 198 35 206 A1, DE 197 09 467 A1, DE 42 03 278 A1, DE 33 16 593 A1, DE 38 36 370 A1, DE 24 36 186 A1 or DE 20 03 579 B1, the international patent applications WO 97/46549 or WO 99/14254, or the American U.S. Pat. No. 5,824,373 A, U.S. Pat. No. 4,675,234 A, U.S. Pat. No. 4,634,602 A, U.S. Pat. No. 4,424,252 A, U.S. Pat. No. 4,208,313 A, U.S. Pat. No. 4,163,810 A, U.S. Pat. No. 4,129,488 A, U.S. Pat. No. 4,064,161 or U.S. Pat. No. 3,974,303 A.

Clearcoat materials, powder clearcoat materials, and powder slurry clearcoat materials that are curable thermally and with actinic radiation are disclosed, for example, by the patent applications DE 198 18 735 A1, WO 98/40170, DE 199 08 013 A1, DE 199 08 018 A1, EP 0 844 286 A1 or EP 0 928 800 A1.

In general, the clearcoat materials are applied in a wet film thickness such that curing thereof results in clearcoats having the thicknesses which are advantageous and necessary for their functions. These thicknesses are preferably from 10 to 100 µm, more preferably from 15 to 80 µm, with particular preference from 20 to 75 µm, and in particular from 25 to 70 µm.

Following application, the color and/or effect layers (2) are cured together with the clearcoat layers, thermally or both thermally and with actinic radiation.

Curing may take place after a certain rest period or flash-off time. This may have a duration of from 30 s to 2 h, preferably from 1 min to 1 h, and in particular from 1 min to 45 min. The rest period is used, for example, for the leveling and devolatilization of the layers and for the evaporation of volatile constituents such as any water and/or solvent still present.

Curing with actinic radiation is preferably carried out using a dose of from 1000 to 2000, more preferably from 1100 to 1900, with particular preference from 1200 to 1800, with very particular preference from 1300 to 1700, and in particular from 1400 to 1600 mJ/cm$^2$. If desired, this curing may be supplemented by actinic radiation from other radiation sources. In the case of electron beams, it is preferred to operate under an inert gas atmosphere. This may be ensured, for example, by supplying carbon dioxide and/or nitrogen directly to the surface of the clearcoat layer. In the case of curing with UV radiation it is also possible to operate under inert gas in order to prevent the formation of ozone.

Curing with actinic radiation is carried out using the customary and known radiation sources and optical auxiliary measures. Examples of suitable radiation sources are flashlamps from the company VISIT, high or low pressure mercury vapor lamps, which may have been doped with lead in order to open up a radiation window up to 405 nm, or electron beam sources.

The thermal curing also has no special features as to its method but instead takes place in accordance with the customary and known methods such as heating in a forced air oven in countercurrent or irradiation using IR and/or NIR lamps. Advantageously, thermal curing is effected at temperatures above 90° C. The maximum curing temperatures are dependent on the heat distortion resistance of the carrier or of the carrier film.

The films of the invention, especially those prepared by the process of the invention, comprise or consist of
(1) at least one, especially one, component layer (1) comprising at least one color and/or effect pigment (1) in anisotropic distribution, and
(2) at least one, especially one, component layer (2) comprising the pigment or pigments (1) and/or at least one different color and/or effect pigment (2) in isotropic distribution.

The films of the invention are outstandingly suitable for producing decorative and/or protective coatings on motor vehicle bodies and parts thereof, the interior and exterior of motor vehicles, the inside and outside of buildings, doors, windows, and furniture, and also in the context of the industrial coating of small parts, coils, containers, packaging, electrical components, and white goods.

In particular they are outstandingly suitable, owing to their isotropic flop behavior and their isotropic color locus, both of which are independent of the viewing angle, so that their processing into coatings for three-dimensional articles is no longer accompanied by any logistical problems or large amounts of offcuts, the high hiding power, even in the extended areas, of the coatings of the invention produced from the films of the invention, and their other outstanding profile of performance properties, which, as regards gloss, distinctiveness of image, uniformity of hiding ability, uniformity of film thickness, resistance to motor fuel, solvents and acids, hardness, abrasion resistance, mar resistance, impact strength, adhesion, weathering stability, and resistance to water and moisture, exhibits the so-called "automotive quality", as a replacement for the conventional multicoat color and/or effect basecoat/clearcoat system of coating motor vehicle bodies and parts thereof.

The production of the coatings of the invention on the three-dimensional articles, especially on motor vehicle bodies, has no special features as to its method but instead may be carried out by means of the customary techniques and apparatus such as are known, for example, from the American U.S. Pat. No. 4,810,540 A, U.S. Pat. No. 4,931,324 A or U.S. Pat. No. 5,114,789 A or the European patents EP 0 266 109 B1, EP 0 285 071 B1, EP 0 352 298 B1 or EP 0 449 982 B1.

EXAMPLES 1 (INVENTIVE) AND C1 AND C2 (COMPARATIVE)

The Preparation of an Inventive Film (Example 1) and of Two Noninventive Films (Examples C1 and C2)

Example 1

In Example 1, the permanent carrier used was a 300 µm thermoplastic ABS monofilm. On a continuous film coating unit, the film was coated on one side with a metallic aqueous basecoat material (color: "silver metallic") using a blade coater. The parameters set were as follows:

| Solids content of the aqueous basecoat material: | 19% by weight; |
| --- | --- |
| Viscosity of the aqueous basecoat material: | 200 mPas (shear rate: 50 s$^{-1}$); |
| Rate of advance of the film: | 1 m/min; |
| Wet layer thickness: | 200 µm. |

After passing through a 2 m evaporation section, the resulting wet layer was overcoated with the same aqueous basecoat material. This was done using a pneumatic spray gun (Devilbiss® AGG-511) which was moved backward and forward across the film web transversely to the direction of advance of the film. The parameters set were as follows:

| Flow rate: | 380 cm$^3$/min; |
| --- | --- |
| Atomizer air pressure: | 5 bar; |
| Nozzle/film distance: | 50 cm; |
| Rate of advance: | 1 m/min. |

The resulting wet layer was dried thermally using hot air (120° C. upon entry of the air) in a 3 m nozzle tunnel. The resulting film of the invention was wound up onto a roll.

To determine the calorimetric data, specimens cut from the film of the invention were overcoated with a solventborne two-component clearcoat material from BASF Coatings AG. The resulting clearcoat layers were cured together with the effect layers at 120° C. for 30 minutes. The clearcoats had a dry thickness of 35 µm.

Example C1

Example 1 was repeated except that the wet layer produced in the first step was not overcoated with the aqueous basecoat material.

Example C2

Example 1 was repeated, but only one aqueous basecoat layer was applied by spray application.

The table gives an overview of the construction of the film of the invention and of the noninventive films.

Table: the Construction of the Inventive Film (Example 1) and of the Noninventive Films (Examples C1 and C2)

| Layer | Examples | | |
| --- | --- | --- | --- |
|  | 1 (µm) | C1 (µm) | C2 (µm) |
| Basecoat: Dry layer thickness: | | | |
| Cast layer | 40 | 40 | — |
| Sprayed layer | 10 | — | 20 |
| Total layer | 50 | 40 | 20 |
| Clearcoat: | 35 | 35 | 35 |

The colorimetric data of the films were measured using an X-Rite Smartscan, the measurement method employed being the "metallic paint" method.

Colorimetric evaluation showed that in terms of color, brightness and flop characteristics, the films of the invention prepared by the process of the invention were fully in accordance with a multicoat automotive OEM finish produced purely by spray application (Example C2). In particular, no strong anisotropies in brightness were observed, which dominate the visual perception in comparison to the color information. However, the coating produced from the noninventive film of Example C2 did not have the necessary hiding power in the extended areas. The noninventive film of Example C1 exhibited severe anisotropies in brightness and in metallic effect, which did not permit its use as a substitute for a conventional automotive OEM finish. In contrast, the inventive films of Example 1 represented a fully equivalent replacement for the automotive OEM finishes of the basecoat/clearcoat type produced by spray application.

What is claimed is:

1. A method of producing a color and/or effect film comprising at least one color and/or effect layer prepared by a process comprising (1) continuously applying by an at least one applicator of step (1) an at least partial amount of a total amount of at least one basecoat composition (A) comprising one or more color and/or effect pigments by a directed application technique to a carrier, the at least one applicator of step (1) and the carrier being in relative motion with respect to one another, to construct a component layer of the color and/or effect layer in which the pigments are aligned anisotropically, (2) at least once, continuously applying the remainder of the basecoat composition (A) and at least one basecoat composition (B) containing one or more color and/or effect pigments, which is different than the at least one basecoat composition (A), to the component layer formed in step (1), by at least one application technique of step (2) with a least one applicator of step (2), which, in a resulting component layer of step (2), induces no arrangement of the pigments in a preferential direction, the at least one applicator of step (2) and the carrier being in relative motion with respect to one another, to further or fully construct the color and/or effect layer, and (3) drying or at least partially curing the resulting color and/or effect layer to provide a color and/or effect layer with high hiding power exhibiting an isotropic flop behavior and an isotropic color locus, both independent of the viewing angle.

2. The method of claim 1, wherein step (2) is carried out simultaneously with step (1).

3. The method of claim 1, wherein step (2) is carried out after step (1).

4. The method of claim 1, wherein the layer of step (1) has more than 50% of the thickness of the color and/or effect layer.

5. The method of claim 1, wherein the directed application technique of step (1) is selected from the group consisting of casting, knife coating, roller application, extrusion coating, and combinations thereof.

6. The method of claim 5, wherein the at least one applicator of step (1) is selected from the group consisting of casting devices, knife coaters, rollers, extruders, and combinations thereof.

7. The method of claim 1, wherein the at least one applicator of step (1) is stationary.

8. The method of claim 1, wherein the carrier is a film.

9. The method of claim 8, wherein the carrier film comprises at least one thermoplastic.

10. The method of claim 1, wherein the layer of step (1) is vented before step (2).

11. The method of claim 1, wherein an assembly comprising carrier and layer of step (1) is wound up before step (2).

12. The method of claim 1, wherein an assembly comprising the carrier, layer of step (1), and a first layer of step (2) is wound up before further application in step (2).

13. The method of claim 1, wherein the layer formed in a first step in step (2) is the complete color and/or effect layer of step (2).

14. The method of claim 1, wherein the application technique of step (2) is a spray application technique and the at least one applicator of step (2) is a spray applicator.

15. The method of claim 14, wherein spray jet clouds produced by at least two applicators of step (2) overlap.

16. The method of claim 15, wherein a pneumatically produced spray jet cloud is set in periodic motion relative to its spraying direction and relative to the carrier.

17. The method of claim 1, wherein the at least one applicator of step (2) is arranged directly downstream of the at least one applicator of step (1).

18. The method of claim 1, wherein the at least one applicator of step (2) is stationary.

19. The method of claim 18, wherein the at least one stationary applicator of step (2) is arranged transversely and/or obliquely to the direction of motion of an assembly comprising the carrier and layer of step (1) and also, optionally, a first layer of step (2).

20. The method of claim 1, wherein the at least one applicator of step (2) is arranged in such a way as to be movable backward and forward transversely and/or obliquely to the direction of motion of an assembly comprising the carrier and layer of step (1) and also, optionally, a first layer of step (2).

21. The method of claim 1, wherein the at least one applicator of step (2) is movable in a vertical plane.

22. The method of claim 1, wherein the application direction of the at least one applicator of step (2) is vertical and/or oblique with respect to the plane of an assembly comprising the carrier and layer of step (1) and also, optionally, a first layer of step (2).

23. The method of claim 22, wherein the application direction is aligned in and/or against the direction of motion of an assembly comprising the carrier and layer of step (1) and also, optionally, a first layer of step (2).

24. The method of claim 1, wherein the color and/or effect layer is covered with a clearcoat film or with a clearcoat.

25. The method of claim 1, further comprising applying the film to one of a motor vehicle body, a motor vehicle part, a building, a door, a window, furniture, a part, a coil, a container, a packaging, an electrical component, or a white good.

26. The method of claim 25, wherein the films are applied as a multilayer color and/or effect basecoat/clearcoat system of a motor vehicle body or a motor vehicle part.

\* \* \* \* \*